(12) United States Patent
Miyamitsu

(10) Patent No.: US 6,816,000 B2
(45) Date of Patent: Nov. 9, 2004

(54) BOOSTER CIRCUIT

(75) Inventor: Fumiaki Miyamitsu, Kunisaki-machi (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/223,310

(22) Filed: Aug. 19, 2002

(65) Prior Publication Data

US 2002/0196070 A1 Dec. 26, 2002

Related U.S. Application Data

(62) Division of application No. 09/642,280, filed on Aug. 18, 2000, now Pat. No. 6,469,569.

(51) Int. Cl.⁷ .............................. G05F 1/10; G05F 3/02
(52) U.S. Cl. ...................................................... 327/536
(58) Field of Search ................................ 327/536, 589; 363/59–60

(56) References Cited

U.S. PATENT DOCUMENTS

| | | | | |
|---|---|---|---|---|
| 5,191,232 A | * | 3/1993 | Wang | 327/306 |
| 5,276,646 A | | 1/1994 | Kim et al. | 365/189.09 |
| 5,420,505 A | | 5/1995 | Kondo | 324/158.1 |
| 5,999,425 A | * | 12/1999 | Lacey et al. | 363/60 |
| 6,091,282 A | | 7/2000 | Kim | 327/536 |
| 6,100,752 A | * | 8/2000 | Lee et al. | 327/536 |
| 6,278,316 B1 | | 8/2001 | Tanzawa et al. | 327/536 |
| 6,297,687 B1 | | 10/2001 | Sugimura | 327/536 |

FOREIGN PATENT DOCUMENTS

| | | | | |
|---|---|---|---|---|
| JP | 02062796 A | * | 3/1990 | G11C/16/06 |
| JP | 11146634 A | * | 5/1999 | H02M/3/07 |
| JP | 11308856 A | * | 11/1999 | H02M/3/07 |

* cited by examiner

*Primary Examiner*—Quan Tra
(74) *Attorney, Agent, or Firm*—William B. Kempler; W. James Brady, III; Frederick J. Telecky, Jr.

(57) ABSTRACT

The objective of the invention is to provide a booster circuit with reduced power consumption and switching noise. Booster circuit 1 of the present invention has gate circuits $4_1$–$4_7$ an auxiliary control circuit 9. Each of gate circuits $4_1$–$4_7$ has charging/discharging circuit 11 and auxiliary charging/discharging circuit 12 used for charging/discharging capacitors $5_1$–$5_7$. Under the control of auxiliary control circuit 9, said charging/discharging circuit 11 can operate independently or operate together with auxiliary charging/discharging circuit 12. When the booster circuit is started, charging/discharging circuit 11 and auxiliary charging/discharging circuit 12 are operated together to increase the drivability of gate circuits 4. As a result, the charging time of capacitors $5_1$–$5_7$ in charge-pump circuits $2_1$–$2_7$ can be shortened. On the other hand, at steady state, charging/discharging circuit 11 operates independently. As a result, the drivability of the gate circuits is reduced compared with that at the time when the booster circuit is started. Consequently, the loss in power consumption and noise can be reduced.

2 Claims, 6 Drawing Sheets

BOOSTER CIRCUIT

This application is a division of application No. 09/642,280 filed Aug. 18, 2000, now U.S. Pat. No. 6,469,569.

FIELD OF THE INVENTION

The present invention pertains to a booster circuit. In particular, the present invention pertains to a charge-pump-type booster circuit used in power supply circuits, etc.

BACKGROUND OF THE INVENTION

Reference numeral 101 in FIG. 10 represents an example of a conventional booster circuit.

Said booster circuit 101 has multiple charge-pump circuits and is formed by connecting the charge-pump circuits in series. In this case, the booster circuit has 7 charge-pump circuits $102_1$–$102_7$.

The input terminal of charge-pump circuit $102_1$ of the first stage is connected to power supply voltage Vcc, and its output terminal is connected to charge-pump circuit $102_2$ of the second stage.

The input terminals of the charge-pump circuits of the stages subsequent to the first stage are connected to the output terminals of the charge-pump circuits of the previous stages up to the last stage, that is, the input terminals of the charge-pump circuits $102_2$–$102_6$ of the second through sixth stages are connected to the output terminals of the charge-pump circuits of the respectively previous stage.

The input terminal of charge-pump circuit $102_7$ of the last stage is connected to the output terminal of charge-pump circuit $102_6$ of the previous stage, and its output terminal is connected to output terminal 110 via a diode 180 for preventing reverse current. The boosted voltage can be output from said output terminal 110 to the load circuit (not shown in the figure). Also, an output capacitor 190 is connected between output terminal 110 and ground.

The internal configuration of each charge-pump circuit 102 is the same. Each charge-pump circuit is comprised of diode 103, gate circuit 104, and capacitor 105.

The anode terminal of each diode 103 is used as the input terminal of each charge-pump circuit 102. The anode terminal of diode $103_1$ of charge-pump circuit $102_1$ of the first stage is connected to power supply voltage Vcc. The anode terminals of diodes $103_2$–$103_7$ of charge-pump circuits $102_2$–$102_7$ from the second stage on are connected to the cathode terminals of diodes $103_1$–$103_6$ of charge-pump circuits $102_1$–$102_6$ of the previous stage. The cathode terminal in charge-pump circuit $102_7$ of the last stage is connected to output terminal 110 via diode 180 for preventing the flow of reverse current.

One terminal of each capacitor 105 is connected to the cathode terminal of one of diodes $103_1$–$103_7$, and the other terminal of capacitor 105 is connected to the output terminal of gate circuit 104 to be described below.

Gate circuit 104 is an inverter circuit. The input terminal of the gate circuit is used as the control terminal of the charge-pump circuit where the control signal is input. When a high-level control signal is input, the terminal of capacitor 105 on the low-potential side is connected to ground GND. When a low-level control signal is input, the terminal of capacitor 105 on the low-potential side is connected to power supply voltage Vcc.

When a high-level control signal is input to gate circuit $104_1$ of the first stage, gate circuit $104_1$ of the first stage connects the terminal of capacitor $105_1$ on the low-potential side of charge-pump circuit $102_1$ of the first stage to ground GND. At that time, since the power supply voltage Vcc is applied to the anode terminal of diode 103, of charge-pump circuit $102_1$ of the first stage, diode $103_1$ is forward-biased, and capacitor 105, is charged to the power supply voltage Vcc.

Next, when a low-level control signal is input to gate circuit $104_1$ of charge-pump circuit $102_1$ in the first stage, the terminal of capacitor 105, on the low-potential side is connected to power supply voltage Vcc, and the voltage at the terminal of capacitor 105 on the high-potential side is boosted by as much as the power supply voltage Vcc from the charged voltage (Vcc) on capacitor $105_1$ to becomes 2Vcc. Since the potential at the anode terminal of diode $103_1$ in charge-pump circuit $102_1$ of the first stage is the power supply voltage Vcc, which is less than the potential at the cathode terminal, diode $103_1$ is reverse-biased.

In that state, gate circuit $104_2$ of charge-pump circuit $102_2$ of the second stage connects the terminal of capacitor $105_2$ on the low-potential side to ground GND. Since 2Vcc is applied to the anode terminal of diode $103_2$ of charge-pump circuit $102_2$ of the second stage, diode $103_2$ is forward-biased, and capacitor $105_2$ of charge-pump circuit $102_2$ of the second stage is charged by the boosted voltage 2Vcc.

Next, when gate circuit $104_2$ of charge-pump circuit $102_2$ of the second stage connects the terminal of capacitor $105_2$ on the low-potential side to power supply voltage Vcc, the voltage at the terminal of capacitor $105_2$ on the high-potential side is boosted by as much as the power supply voltage Vcc from the charged voltage (2Vcc) on capacitor $105_2$ to become 3Vcc. Since the output voltage 2Vcc of charge-pump circuit $102_1$ of the first stage is applied to the anode terminal of diode $103_2$ of the second stage, diode $103_2$ of the second stage is reverse-biased by the boosted voltage 3Vcc.

At that time, when a high level control signal is input to gate circuit $104_3$ of charge-pump circuit $102_3$ of the third stage, gate circuit $104_3$ of charge-pump circuit $102_3$ of the third stage connects the terminal of capacitor $105_3$ on the low-potential side of the third stage to ground GND, and said capacitor $105_3$ is charged by the boosted voltage 3Vcc on charge-pump circuit $102_2$ of the second stage.

In said booster circuit 101, the voltage input to each of charge-pump circuits $102_1$–$102_6$ is boosted by as much as the power supply voltage Vcc as described above. As a result, a voltage equal to (number of charge-pump circuit stages+1)×Vcc, that is, 8Vcc is output from charge-pump circuit $102_7$ of the last stage to a load circuit (not shown in the figure) via diode 180 which is used to prevent the flow of reverse current, at output terminal 110.

In the steady state, each capacitor 105 of said charge-pump circuit 102 is initially charged to a voltage corresponding to the number of stages of charge-pump circuits 102. On the other hand, since the voltage across the two terminals of each capacitor 105 is 0 V before the booster circuit is started, the amount of the electric charge on each capacitor 105 at steady state is greater than that when the booster circuit is started.

Conventionally, the time needed for each capacitor to be charged to a prescribed level when the booster circuit is started can be shortened by increasing the drivability of gate circuit 105 in advance. In this case, since each gate circuit 105 has a drivability higher than the essential level in the steady state, power consumption and noise also become higher than the essential level in the steady state.

In said booster circuit 101, when a high-level control signal is input to gate circuit $104_n$ of charge-pump circuit $102_n$ of a given stage to boost the voltage by as much as the power supply voltage Vcc, low level signals must be input to gate circuits $104_{n-1}$ and $104_{n+1}$ of the charge-pump circuits of the previous and subsequent stages. Therefore, it is preferred to input control signals of opposite phase to the gate circuits of neighboring stages.

Consequently, said conventional booster circuit 101 has a signal-generating circuit 108 used for generating control signals. The same first control signal is input to gate circuits $104_1$, $104_3$, $104_5$, and $104_7$ of the charge-pump circuits of the odd-numbered stages, while a second control signal of different phase than the first control signal is input to gate circuits $104_2$, $104_4$, and $104_6$ of the charge-pump circuits of the even-numbered charge-pump circuits. In this case, the first and second control signals have opposite phase.

In this case, since the same first control signal is input to gate circuits $104_1$, $104_3$, $104_5$, and $104_7$ in the charge-pump circuits of the odd-numbered stages, when the logic level of the first control signal is switched, the logic level of the output signals of gate circuits $104_1$, $104_3$, $104_5$, and $104_7$ are switched at the same time.

On the other hand, since the same second control signal is input to gate circuits $104_2$, $104_4$, and $104_6$ of the charge-pump circuits of the even-numbered stages, when the logic level of the second control signal is switched, the logic levels of the output signals of said gate circuits $104_2$, $104_4$, and $104_6$ are switched at the same time.

When the logic level of the output signal of each gate circuit 104 is switched, charging/discharging of capacitor 105 is switched, and current flows to each gate circuit 104. FIG. 11 shows the relationship between the output signal of the gate circuits and the sum Ica of the currents flowing to all of gate circuits $104_1$–$104_7$.

When the logic level of the output signal is switched, the current flowing to each gate circuit 104 is very small. In the conventional booster circuit, however, since the logic levels of the output signals of gate circuits $104_1$, $104_3$, $104_5$, and $104_7$ of the odd-numbered stages as well as gate circuits $104_2$, $104_4$, and $104_6$ of the even-numbered stages are switched at the same time and capacitors connected to the various gate circuits are charged/discharged at the same time, the currents are concentrated to result in a large current when the logic level is switched. As a result, the switching noise level becomes high.

The purpose of the present invention is to solve the aforementioned problem of the conventional technology by providing a booster circuit which can reduce the power consumption and the switching noise level.

SUMMARY OF THE INVENTION

In order to realize the aforementioned purpose, claim 1 of the present invention provides a booster circuit characterized by the following facts: the booster circuit has N rectifying elements which are electrically connected in series between a voltage input terminal and a voltage output terminal with the terminal on the anode side taken as the aforementioned voltage input terminal side; N capacitors, each of which has one of the terminals electrically connected to the terminal on the cathode side of one of the aforementioned rectifying elements; N drive circuits, each of which has its output terminal electrically connected to the other terminal of the aforementioned capacitor and is able to drive the other terminal of the aforementioned capacitor to a first voltage or a second voltage as a function of a control signal; a signal supply circuit which supplies a first control signal to the aforementioned drive circuits of the odd-numbered stages and supplies a second control signal whose phase is opposite to that of the first control signal to the drive circuits of the even-numbered stages; and an output circuit which monitors the output voltage at the aforementioned voltage output terminal and outputs a disable signal to each of the aforementioned drive circuits when the aforementioned output voltage is above a prescribed level; wherein each of the aforementioned drive circuits has first and second drive units which can drive the other terminal of the aforementioned capacitor to the first or second voltage; and wherein the aforementioned second drive unit is able to suspend driving of the other terminal of the aforementioned capacitor as a function of the aforementioned disable signal.

According to claim 2 of the present invention, the booster circuit described in claim 1 has a diode for preventing reverse current that is electrically connected between the terminal on the cathode side of the rectifying element of the Nth stage and the aforementioned voltage output terminal, and an output capacitor which is connected between the aforementioned voltage output terminal and reference potential where the aforementioned rectifying elements are diodes.

Claim 3 of the present invention provides a booster circuit characterized by the following facts: the booster circuit has N rectifying elements that are electrically connected in series between a voltage input terminal and a voltage output terminal with the terminal on the anode side taken as the aforementioned voltage input terminal side; N capacitors, each of which has one of the terminals electrically connected to the terminal on the cathode side of one of the aforementioned rectifying elements; and a signal supply circuit which supplies a first control signal to the aforementioned capacitors of the odd-numbered stages and supplies a second control signal whose phase is opposite to that of the first control signal to the capacitors of the even-numbered stages; a first time delay is applied sequentially to the first control signal supplied to the other terminal of each capacitor of the odd-numbered stages, and a second time delay is applied sequentially to the second control signal supplied to the other terminal of each capacitor of the even-numbered stages.

According to claim 4 of the present invention, the booster circuit described in claim 3 has a diode for preventing reverse current, which is electrically connected between the terminal on the cathode side of the rectifying element of the Nth stage and the aforementioned voltage output terminal, and an output capacitor which is connected between the aforementioned voltage output terminal and reference potential where the aforementioned rectifying elements are diodes, and the aforementioned signal supply circuit is composed of a ring oscillator.

The booster circuit of the present invention has a first drive unit (charging/discharging circuit) and a second drive unit (auxiliary charging/discharging circuit). The charging/discharging circuit can operate independently or together with the auxiliary charging/discharging circuit.

When the booster circuit is started, both the charging/discharging circuit and the auxiliary charging/discharging circuit are operated together to increase the drivability of the drive circuits (gate circuits) to shorten the capacitor charging time. On the other hand, when the charging/discharging circuit is operated independently in the steady state, which does not require a high drivability, the drivability becomes lower than that at the time when the booster circuit is started. Consequently, the power consumption and noise can be reduced compared with the conventional booster circuit which uses gate circuits with high drivability.

The output voltage (boosted voltage) is at a high level in the steady state but at a low level when the booster circuit is started. Therefore, it is possible to detect whether the booster circuit is in steady state or has just been started by detecting the output of the booster circuit.

Consequently, when the booster circuit is started with the output of the booster circuit at a low level, the charging/discharging circuit is operated together with the auxiliary charging/discharging circuit. When the booster circuit is steady state with the output at a high level, the charging/discharging circuit is operated independently. In this way, the drivability can be increased only when the booster circuit is started.

In another booster circuit of the present invention, the first and second control signals generated in the signal supply circuit (timing control circuit) are applied to the charge-pump circuits comprised of rectifying elements and capacitors in each stage after the control signals are delayed by different periods of time for each charge-pump circuit, respectively. Since each charge-pump circuit is synchronized with the input control signal to perform switching between charging and discharging of a capacitor, the charging/discharging states of the capacitors arranged in the various charge-pump circuits are switched at completely different times, and it is possible to avoid the situation that the charging/discharging states of two or more capacitors are switched at the same time.

In another booster circuit of the present invention, the timing control circuit is made of a ring oscillator comprised of multiple inverters. The output signals of the inverters are input to the charge-pump circuits.

In particular, when the number of inverter stages is equal to the number of charge-pump stages and the output signal of each inverter is input to a charge-pump circuit, in a ring oscillator comprised of N inverters and having a period of T, the signal input to each inverter is delayed by (T/(2×N)). Consequently, the output signals of the inverters are always switched one at a time.

Since each charge-pump circuit switches the charging/discharging state of the capacitor of each charge-pump circuit as a result of switching of the output signal of the inverter, the charging/discharging states of the capacitors can always be switched one at a time.

BRIEF DESCRIPTION OF THE DRAWINGS

FIG. 5($b$) is a diagram illustrating the waveform of the current flowing in a gate circuit with a low drivability.

Figure 1:
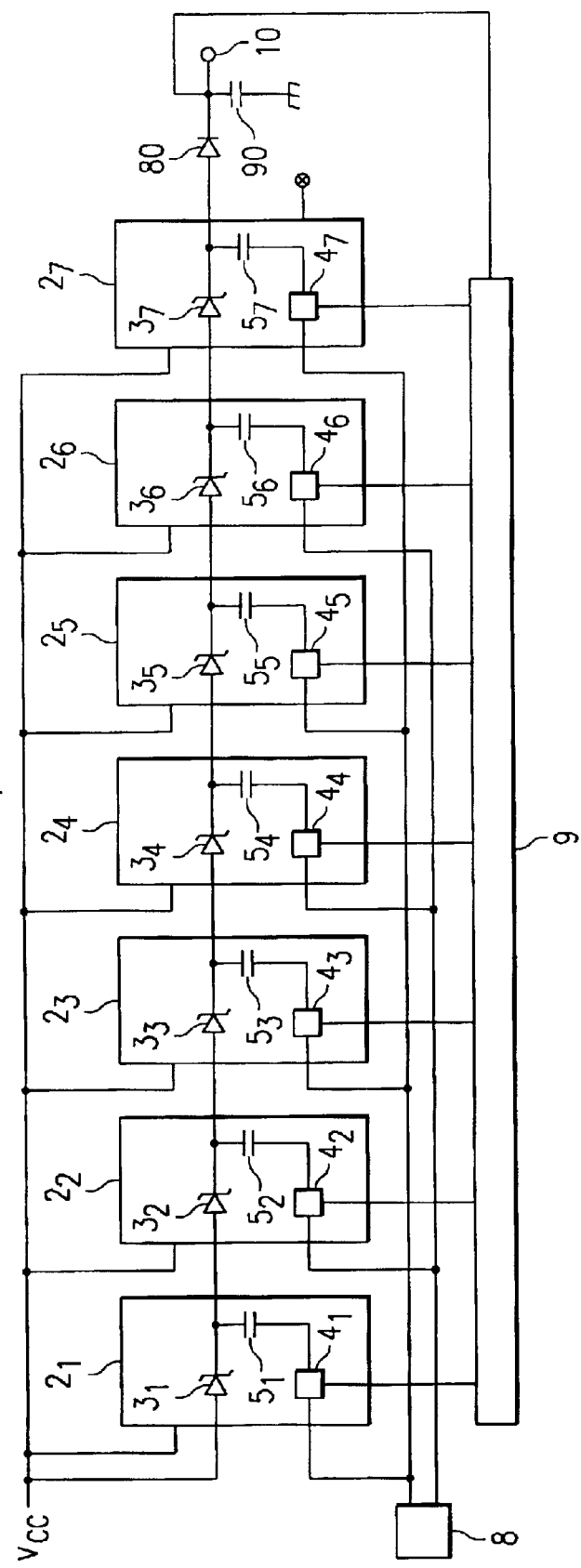
FIG. 1 is a circuit diagram illustrating the booster circuit disclosed in an embodiment of the present invention.

REFERENCE NUMBERS AND SYMBOLS AS SEEN IN THE DRAWINGS 1, 31, 41, 51, Booster circuits, $2_1$–$7$, $3_1$–$31_7$ charge-pump circuits, $3_1$–$3_7$, $33_1$–$33_7$ diodes, $4_1$–$4_7$, $34_1$–$34_7$ gate circuits, $5_1$–$5_7$, $35_1$–$35_7$ capacitors, 38, 48 ring oscillator auxiliary, control circuit 58 timing control circuit.

DESCRIPTION OF EMBODIMENTS

In the following, an embodiment of the present invention will be explained with reference to figures. Reference numeral 1 in FIG. 1 represents the booster circuit in an embodiment of the present invention.

Said booster circuit 1 has seven charge-pump circuits $2_1$–$2_7$, a signal-generating circuit 8, an auxiliary control circuit 9, a diode 80 for preventing reverse current, an output capacitor 90 and an output terminal 10.

Said charge-pump circuits $2_1$–$2_7$ are connected to each other in series. The input terminal of charge-pump circuit $2_1$ of the first stage is connected to the power supply voltage Vcc, and the output terminal is connected to the input terminal of charge-pump circuit $2_2$ of the second stage.

The input terminals of the charge-pump circuits of the stages subsequent to the first stage are connected to the output terminals of the charge-pump circuit in the previous stages up to the last stage, that is, the input terminals of the second through sixth charge-pump circuits $2_2$–$2_6$ are connected to the output terminals of the charge-pump circuits $2_1$–$2_5$ of the respectively previous stage. The output terminals are connected to the input terminals of the charge-pump circuits $2_3$–$2_7$ of the respectively following stage.

The input terminal of charge-pump circuit $2_7$ of the last stage is connected to the output terminal of charge-pump circuit $2_6$ of the previous stage, and the output terminal is connected to output terminal 10 of booster circuit 1 via diode 80 used for preventing reverse current. Also, output terminal 10 is connected to a load circuit (not shown in the figure).

The input terminal of auxiliary control circuit 9 is connected to output terminal 10 to detect the magnitude of the output voltage and output an auxiliary control signal. Each charge-pump circuit 2 has a gate circuit 4. The aforementioned auxiliary control signal is output to each gate circuit 4.

In addition to said gate circuit 4 each charge-pump circuit 2 has a diode 3 and a capacitor 5.

The anode terminal of diode 3 is used as the input terminal of each charge-pump circuit 2. The anode terminal of diode $3_1$ of charge-pump circuit $2_1$ of the first stage is connected to power supply voltage Vcc. The anode terminals of diodes $3_2$–$3_7$ of charge-pump circuits $2_2$–$2_7$ from the second stage on are connected to the cathode terminals of diodes $3_1$–$3_6$ of charge-pump circuits $2_1$–$2_6$ of the respectively previous stages. The cathode terminal of diode $3_7$ of charge-pump circuit $2_7$ of the last stage is connected to output terminal 10 via diode 80 used for preventing the flow of reverse current.

One terminal of each of capacitors $5_1$–$5_7$ is connected to the cathode terminal of one of diodes $3_1$–$3_7$, while the other terminal is connected to the output terminal of one of gate circuits $4_1$–$4_7$.

When a high-level control signal is input from signal-generating circuit 8 to gate circuit $4_1$ of the first stage, the output voltage of gate circuit $4_1$ of the first stage goes to ground potential GND, and the terminal of capacitor $5_1$ on the low-potential side of charge-pump circuit $2_1$ of the first stage is connected to ground potential GND. At that time, diode $3_1$ is forward-biased by the power supply voltage Vcc applied to the anode terminal of diode $3_1$ of the first stage, and capacitor $5_1$ of the first stage is charged by the power supply voltage Vcc.

Next, when a low level control signal is input from signal-generating circuit 8 to gate circuit $4_1$ in the first stage, the terminal of capacitor $5_1$ on the low-potential side is connected to the power supply voltage Vcc, and the potential at the terminal of capacitor $5_1$ on the high-potential side is boosted by as much as the power supply voltage Vcc from the charged voltage on capacitor $5_1$. Diode $3_1$ of charge-pump circuit $2_1$ of the first stage is reverse-biased by the boosted voltage.

When a high level control signal is input to gate circuit $4_2$ of charge-pump circuit 22 of the second stage in that state, the terminal of capacitor $5_2$ on the low-potential side in charge-pump circuit $2_2$ of the second stage is connected to ground GND. Diode $3_2$ of charge-pump circuit $2_2$ of the second stage is forward-biased by the output voltage of charge-pump circuit $2_1$ of the first stage. When capacitor $5_2$ of charge-pump circuit $2_2$ of the second stage is charged, charge is sent from capacitor $5_1$ of the first stage to capacitor $5_2$ of the second stage.

Next, when a low-level control signal is input to gate circuit $4_2$ of charge-pump circuit $2_2$ of the second stage, the terminal of capacitor $5_2$ on the low-potential side of the second stage is connected to the power supply voltage Vcc. The potential at the terminal of capacitor $5_2$ on the high-potential side of the second stage is boosted by as much as the power supply voltage Vcc from the charged voltage of capacitor $5_2$ of the second stage, and diode $3_2$ is reverse-biased by the boosted voltage.

At that time, when a high level control signal is input to gate circuit $4_3$ of charge-pump circuit $2_3$ of the third stage, gate circuit $4_3$ in charge-pump circuit $2_3$ of the third stage connects the terminal of capacitor $5_3$ of charge-pump circuit $2_3$ of the third stage to ground GND. Capacitor $5_3$ of the third stage is charged by the output voltage of charge-pump circuit $2_2$ of the second stage, and charge is sent from capacitor $5_2$ of the second stage to capacitor $5_3$ in the third stage.

When capacitors $5_1$–$5_7$ are respectively charged by charge-pump circuits $2_1$–$2_7$, charge is sent sequentially to capacitor $5_7$ of charge-pump circuit $2_7$ of the last stage, and the voltage input to each of charge-pump circuits $2_1$–$2_7$ can be boosted. From the high-voltage side terminal of capacitor $5_7$ of charge-pump circuit $2_7$ of the last stage, the boosted voltage can be supplied from the output terminal to a load circuit via diode 80 for preventing the flow of reverse current.

Figure 2:
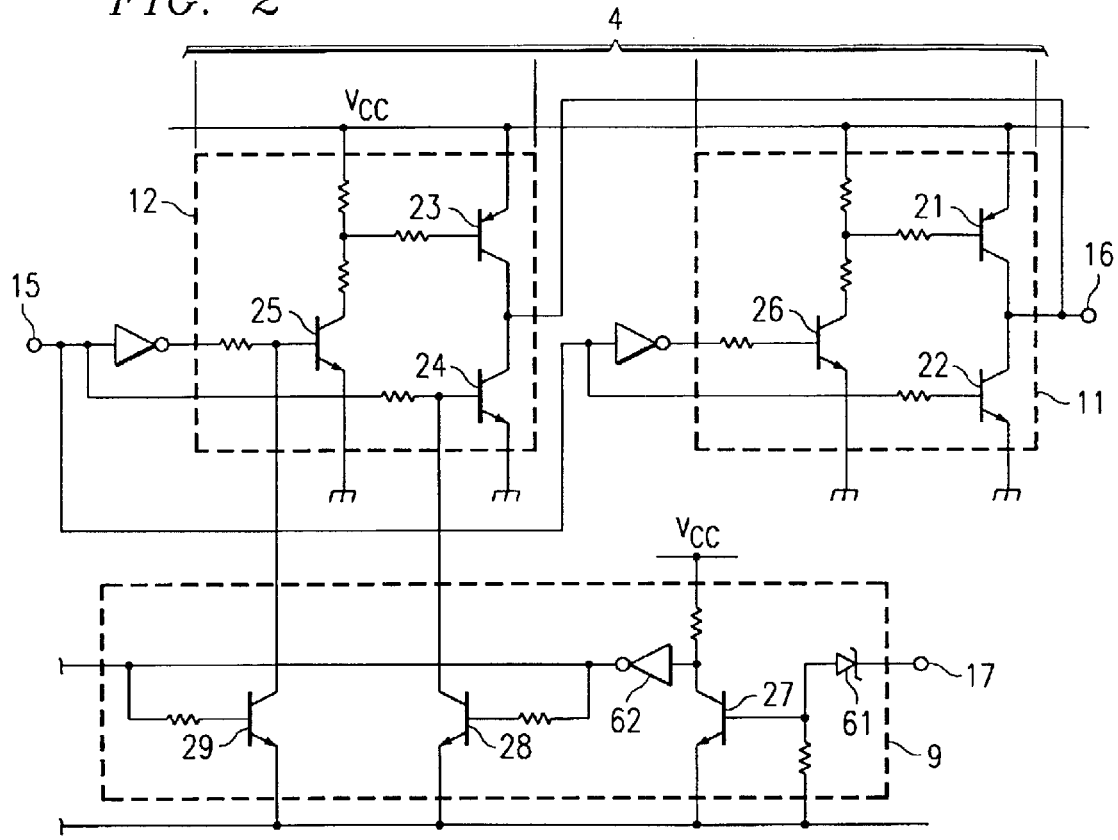
FIG. 2 is a circuit diagram illustrating the relationship between the gate circuits and the auxiliary control circuit of the booster circuit disclosed in an embodiment of the present invention.

As shown in FIG. 2, each of said gate circuits 4 has input terminal 15, output terminal 16, charging/discharging circuit 11, auxiliary charging/discharging circuit 12.

Input terminal 15 is connected to the output terminal of said signal-generating circuit 8, while output terminal 16 is connected to the terminal of capacitor 5 on the low voltage side.

Charging/discharging circuit 11 has push-pull connected pnp and npn output transistors 21 and 22 as well as npn drive transistor 26.

The emitter terminal of drive transistor 26 is grounded, and the collector terminal is connected to the power supply voltage and the base terminal of pnp output transistor 21 via a resistor.

The collector terminal of pnp output transistor 21 is connected to the collector terminal of npn output transistor 22, and the emitter terminal is connected to the power supply voltage Vcc. The emitter terminal of npn output transistor 22 is grounded.

In charging/discharging circuit 11, when a control signal is input to input terminal 15 of the gate circuit, the control signal is input to the base terminal of npn output transistor 22 and also input to the base terminal of drive transistor 26 after being inverted by an inverter. The two collector terminals of output transistors 21 and 22 are both connected to output terminal 16 of the gate circuit.

When a low-level control signal is input to input terminal 15 of gate circuit 4, driving transistor 26 conducts since an inverted high level signal is input at its base terminal. As a result, the base potential of pnp output transistor 21 drops to reach a conductive state. At that time, since npn output transistor 22 is off since a low-level signal is input at its base terminal, output terminal 16 of the gate circuit is connected to the power supply voltage Vcc via pnp transistor 21, and the terminal of capacitor 5 on the low voltage side is connected to the power supply voltage Vcc.

On the other hand, when a high level control signal is input to input terminal 15, the aforementioned operation is reversed. Since pnp transistor 21 and npn transistor 22 become nonconducting and conducting, respectively, output terminal 16 of the gate circuit is connected to the ground potential via npn transistor 22, and the terminal of capacitor 5 on the low-voltage side is grounded.

Said auxiliary charging/discharging circuit 12 has npn drive transistor 25 as well as pnp and npn output transistors 23 and 24. These transistors respectively correspond to drive transistor 26 and output transistors 21 and 22 of said charging/discharging circuit 11. Since the internal configuration of auxiliary charging/discharging circuit 12 is identical to that of charging/discharging circuit 11, its detailed explanation has been omitted.

Said auxiliary charging/discharging circuit 12 is connected in parallel with charging/discharging circuit 11 between input and output terminals 15, 16 of gate circuit 4 and can operate together with charging/discharging circuit 11. Said auxiliary charging/discharging circuit 12 is operated under the control of auxiliary control circuit 9 and is able to operate together with charging/discharging circuit 11.

Said auxiliary control circuit 9 has Zener diode 61, inverter 62, npn detecting transistor 27, npn control transistors 28 and 29.

The cathode terminal of Zener diode 61 is connected to output terminal 10 of the booster circuit via an auxiliary control terminal 17, and its anode terminal is connected to the base terminal of detecting transistor 27. The diode conducts when the potential at output terminal 10 of the booster circuit goes high. As a result, the potential at the base terminal of detecting transistor 27 goes high. Also, the base terminal of detecting transistor 27 is connected to ground via a resistor.

The emitter terminal of detecting transistor 27 is connected to ground potential. Its collector terminal is connected to the power supply voltage Vcc via a resistor and is also connected to the input terminal of inverter 62. The transistor conducts when the potential at the base terminal goes high. The input terminal of the inverter is connected to ground potential. The potential at the input terminal of inverter 62 is kept at the low level.

The output terminal of inverter 62 is connected to the base terminals of control transistors 28 and 29 via a resistor. When the potential at the input terminal is at the low level, a high-level signal is output to the base terminals of control transistors 28 and 29.

The collector terminals of control transistors 28 and 29 are connected to the base terminals of npn transistor 24 of auxiliary charging/discharging circuit 12 and drive transistor 25, respectively. The emitter terminals are connected to ground potential. The transistors conduct when the potential at the base terminal is at the high level.

When control transistors 28 and 29 conduct, the base terminals of drive transistor 25 and npn output transistor 24 of auxiliary charging/discharging circuit 12 are connected to ground potential via control transistors 28 and 29, respectively. As a result, the operations of driving transistor 25 and npn output transistor 24 of auxiliary charging/discharging circuit 12 are stopped, and the operation of auxiliary charging/discharging circuit 12 is disabled.

Figure 3:
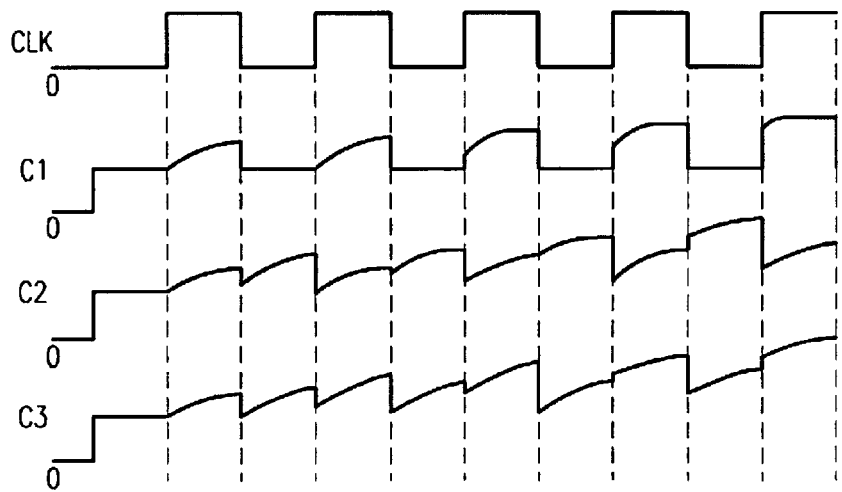
FIG. 3 is a diagram illustrating the waveform of the output voltage of each charge-pump circuit when the booster circuit of the present invention is started.

FIG. 3 shows the waveform of the output voltage of each charge-pump circuit 2 when booster circuit 1 is started. In FIG. 3, C1, C2, and C3 respectively represent the output voltage waveforms of charge-pump circuits $2_1$, $2_2$, and $2_3$ of the corresponding first, second, and third stages.

When booster circuit 1 is started, a low voltage appears at output terminal 10 of booster circuit 1. Therefore, Zener diode 61 of auxiliary control circuit 9 is non-conducting, as is detection transistor 27. As a result, the input voltage of inverter 62 is on the high level. Consequently, the output voltage of inverter 62 is low and low voltage is applied to the base terminals of control transistors 28 and 29. As a result, both control transistors 28 and 29 are nonconducting.

Since the base terminals of drive transistor 25 and npn output transistor 24 in auxiliary charging/discharging circuit 12 are not connected to the ground potential via control transistors 28 and 29, drive transistor 25 and output transistor 24 operate corresponding to the potential at input terminal 15 of the gate circuit, and auxiliary charging/discharging circuit 12 operates together with charging/discharging circuit 11. When charging/discharging circuit 11 operates together with auxiliary charging/discharging circuit 12, the drivability of gate circuit 4 is increased.

Figure 4:
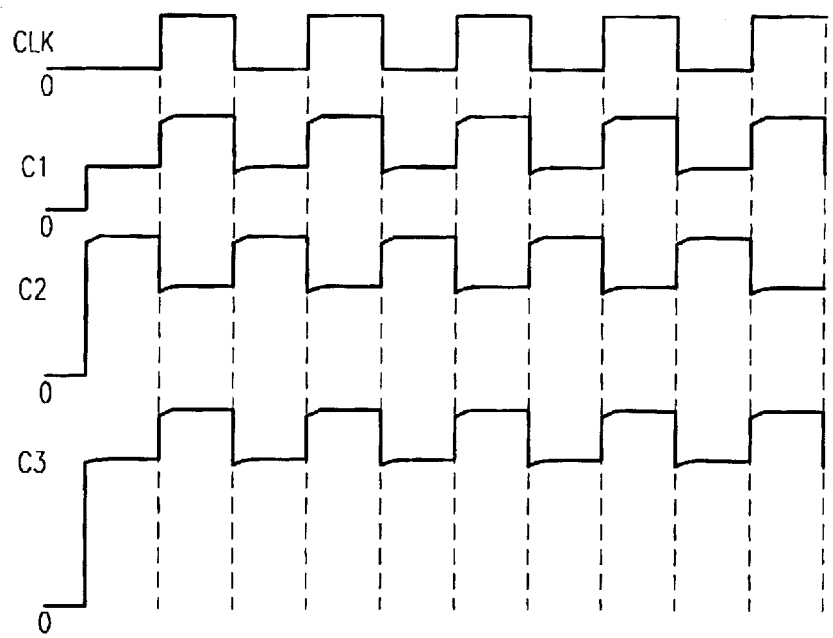
FIG. 4 is a diagram illustrating the steady-state output voltage waveform of each charge-pump circuit of the booster circuit disclosed in the present invention.

When each capacitor 5 is charged/discharged by a gate circuit 4 with a high drivability and charge is transferred sequentially from charge-pump circuit $2_1$ of the first stage to charge-pump circuit $2_7$ of the last stage, the voltage at output terminal 10 of booster circuit 1 is able to rise and soon reach the steady state. FIG. 4 shows the output voltage of each charge-pump circuit at steady state. In FIG. 4, CLK represents the waveform of the control signal input to charge-pump circuit 22 of the second stage. C1, C2, and C3 respectively represent the waveforms of the output voltages of charge-pump circuits $2_1$, $2_2$, and $2_3$ of the corresponding first, second, and third stages.

At steady state, charge-pump circuit 21 of the first stage boosts the input power supply voltage Vcc by Vcc and outputs the boosted voltage 2Vcc to charge-pump circuit 22 of the second stage. Charge-pump circuit $2_2$ of the second stage boosts the boosted voltage 2Vcc from charge-pump circuit $2_1$ of the first stage by Vcc and outputs this boosted voltage to charge-pump circuit $2_3$ of the third stage. Each of charge-pump circuits $2_1$–$2_7$ boosts the input voltage by Vcc. Consequently, a voltage equal to the (number of charge-pump circuit stages+1)×Vcc, that is, 8Vcc is output from charge-pump circuit $2_7$ of the last stage. The output voltage is output to a load circuit (not shown in the figure) via diode 80 which prevents the flow of reverse current, and output terminal 10.

At steady state, since the voltage at output terminal 10 of the booster circuit is at the high level, Zener diode 61 of auxiliary control circuit 9 conducts. Detection transistor 27 also conducts. As a result, the input terminal of inverter 62 is connected to ground via detection transistor 27. Consequently, the output voltage of inverter 62 reaches the high level, and both control transistors 28 and 29 conduct.

Since the base terminals of drive transistor 25 and output transistor 24 of auxiliary charging/discharging circuit 12 are connected to ground via control transistors 29 and 28, respectively, drive transistor 25 and output transistor 24 are off, and the operation of auxiliary charging/discharging circuit 12 is disabled. When the operation of auxiliary charging/discharging circuit 12 is disabled, charging/discharging circuit 11 operates independently in the steady state. When the charging/discharging circuit operates independently, the drivability of gate circuit 4 is less than that when the charging/discharging circuit operates together with the auxiliary charging/discharging circuit.

Next, when current flows to the load circuit, the charge on capacitor $5_7$ of the last stage is reduced, and the charge deficit can be restored by transferring charge from the previous stage to the next stage. In this case, however, charging/discharging circuit 11 also operates independently, and the drivability of each gate circuit 4 is kept low.

As explained above, when booster circuit 1 is started, charging/discharging circuit 11 operates together with auxiliary charging/discharging circuit 12 to increase the drivability of gate circuit 4. At steady state, charging/discharging circuit 11 operates independently. As a result, the drivability of gate circuit 4 is reduced.

Figure 5A:
FIG. 5($a$) is a diagram illustrating the waveform of the current flowing in a gate circuit with a high drivability.
Figure 5B:

FIGS. 5(a) and 5(b) show the waveforms of the currents flowing from the side of power supply voltage Vcc to each gate circuit for the case when gate circuits with high drivability are used and for the case when gate circuits with low drivability are used, respectively. As shown in FIGS. 5(a) and 5(b), when gate circuits with high drivability are used, the inrush current that flows at the time of switching is high. When gate circuits with low drivability are used, the current that flows at the time of switching is low.

In the conventional booster circuit which uses gate circuits with constantly high drivability, since a large inrush current as shown in FIG. 5(a) flows at steady state, the loss in the power consumption, and the noise level are high. In the present embodiment, however, since high drivability is required when the booster circuit is started, the drivability of each gate circuit 4 is increased by operating charging/discharging circuit 11 together with auxiliary charging/discharging circuit 12. On the other hand, at steady state when high drivability is unnecessary, charging/discharging circuit 11 is operated independently to reduce the drivability of gate circuit 4. As a result, the current is reduced as shown in FIG. 5(b). Consequently, compared with the conventional case, the loss in power consumption and noise can be reduced at steady state.

Figure 6:
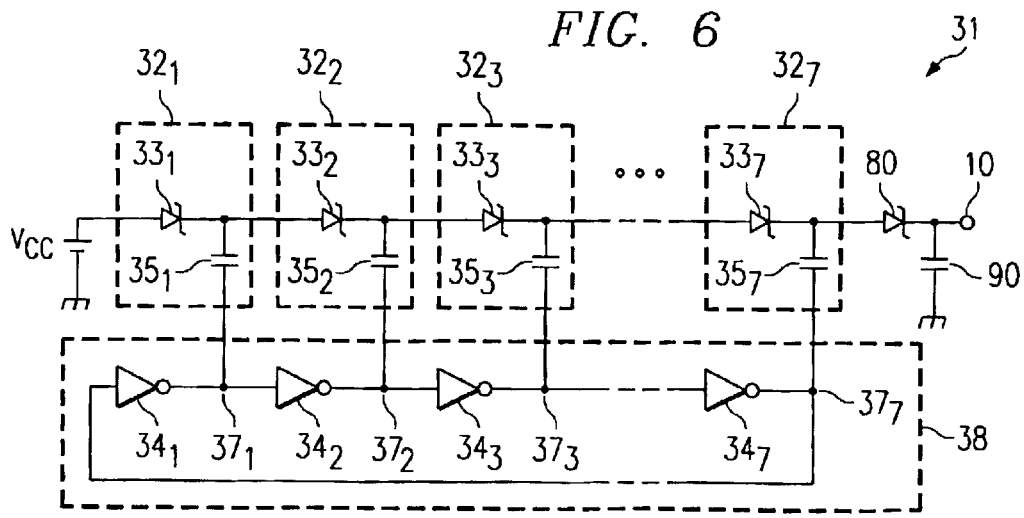
FIG. 6 is a circuit diagram illustrating the booster circuit disclosed in another embodiment of the present invention.

Another embodiment of the present invention will be explained below In FIG. 6, 31 represents the booster circuit disclosed in another embodiment of the present invention.

Like booster circuit 1 shown in FIG. 1, said booster circuit 31 is constituted by connecting multiple charge-pump circuits in series. In this case, seven charge-pump circuits $32_1$–$32_7$ are interconnected to each other in series.

Like charge-pump circuits $2_1$–$2_7$ shown in FIG. 1, said charge-pump circuits $32_1$–$32_7$ also have diodes $33_1$–$33_3$ and capacitors $35_1$–$35_7$, respectively. However, gate circuits $34_1$–$34_7$ used for controlling charging/discharging of capacitors $35_1$–$35_7$ comprise inverters and are arranged outside charge-pump circuits $32_1$–$32_7$. This is different from charge-pump circuits $2_1$–$2_7$ shown in FIG. 1.

Said gate circuits $34_1$–$34_7$ are interconnected in series. The output of gate circuit $34_7$ of the last stage is input to gate circuit $34_1$ of the first stage. A ring oscillator 38 comprises said gate circuits $34_1$–$34_7$.

The output terminals of gate circuits $34_1$–$34_7$ are connected to the terminals of capacitors $35_1$–$35_7$ on the low-potential side of charge-pump circuits $32_1$–$32_7$, respectively. When the output signal is on the low level or high level, said gate circuits $34_1$–$34_7$ can connect the terminals of capacitors $35_1$–$35_7$ on the low-potential side to ground or the power supply voltage to charge/discharge capacitors $35_1$–$35_7$.

Figure 7:
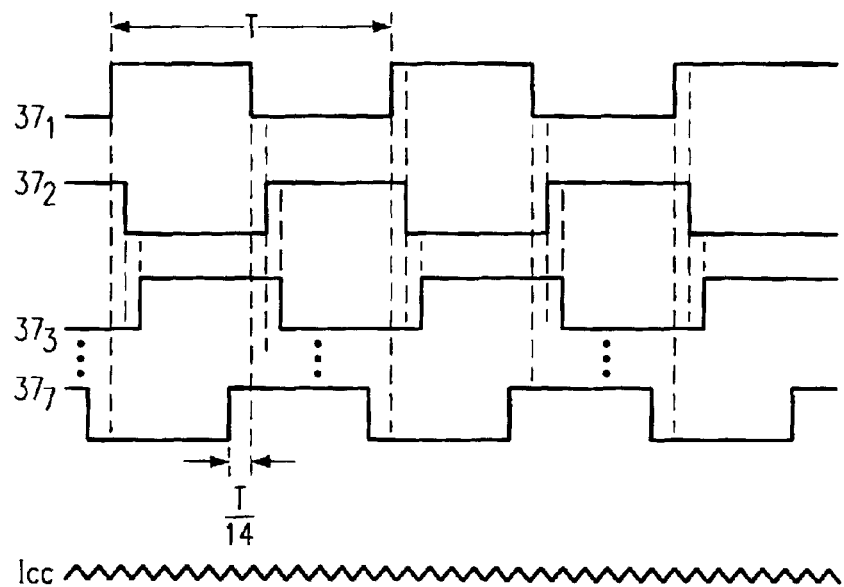
FIG. 7 is a waveform diagram explaining the operation of the ring oscillator in the booster circuit disclosed in another embodiment of the present invention.

The operation of ring oscillator 38 will be explained below. FIG. 7 shows the waveforms of output voltages $37_1$–$37_7$ of gate circuits $34_1$–$34_7$.

Gate circuits $34_1$–$34_7$ of ring oscillator 38 invert the input signal and output it to the gate circuit of the next stage after delaying the input signal by a time period τ.

When the output signal of gate circuit $34_1$ of the first stage is at the high level, a high level signal is input to gate circuit $34_2$ of the second stage, inverted to the low level, delayed by τ, and then output to gate circuit $34_3$ of the third stage. The low-level signal input to gate circuit $34_3$ of the third stage is inverted to the high level in gate circuit $34_3$ of the third stage, delayed by τ, and then output to gate circuit $34_4$ of the fourth stage. The output signal of gate circuit $34_1$ of the first stage is sequentially reversed and delayed by τ in gate circuits 34 and is ultimately output to gate circuit $34_7$ of the last stage.

The output signal of gate circuit $34_7$ of the last stage is inverted a total of 6 times by gate circuits $34_2$–$34_7$ from the second stage to the last stage. Then, the output signal of the final gate circuit which is at the high level is output to the input terminal of gate circuit $34_1$ in the first stage. After that, a low-level signal is output from gate circuit $34_1$ of the first stage, successively inverted by each of the gate circuits $34_2$–$34_7$, and output to the gate circuit of the next stage.

When signals are inverted and transferred by gate circuits $34_1$–$34_7$ as described above, the signals from two neighboring gate circuits will be output out of phase The power supply voltage Vcc input to charge-pump circuit $32_1$ of the first stage is sequentially boosted by as much as the power supply voltage Vcc by each of the charge-pump circuits $32_1$–$32_7$. As a result, a boosted voltage equal to (the number of stages of the charge-pump circuits+1)×Vcc is output from charge-pump circuit $32_7$ of the last stage to a load circuit (not shown in the figure) via diode (80), which prevents the flow of reverse current, and output terminal 10.

The number of stages of gate circuits $34_1$–$34_7$ is 7. The signal delayed by a time period τ of each of the gate circuits $34_1$–$34_7$ will return to the original phase when delayed 7×2 times. Therefore, if the oscillation period of the ring oscillator is T, the relationship 7×2τ=T can be obtained, and the time delay τ of each gate circuit will be T/14.

Consequently, when the logic level of the output signal of one of gate circuits $34_1$–$34_7$ is switched, the logic level of the output signal of gate circuits $34_2$–$34_7$ of the next stage will be switched after a period of τ=T/14 since the point in time that the logic level of the output signal of said one of gate circuits $34_1$–$34_7$ is switched.

In said gate circuits $34_1$–$34_7$, since the logic level of each output signal is sequentially delayed by T/14 before it is switched, the logic levels of the output signals will not be switched simultaneously in two or more gate circuits.

Current will flow to each of gate circuits $34_1$–$34_7$ when the logic level of the output signal is switched. However, as described above, the logic levels of the output signals are not switched simultaneously for two or more gate circuits, unlike the case of the conventional technology, where a large current flows because the logic levels of the output signals of all of the gate circuits are switched at the same time. As shown in FIG. 7, the sum of the currents Ica flowing to various gate circuits 34 is reduced. Therefore, the noise can also be reduced.

In the circuit shown in FIG. 6, ring oscillator 38 comprises gate circuits $34_1$–$34_7$ which charge/discharge capacitors $35_1$–$35_7$, respectively. However, the present invention is not limited to this constitution. For example, as shown by symbol 41 in FIG. 8, seven inverters $39_1$–$39_7$ are used in addition to gate circuits $34_1$–$34_7$. A ring oscillator 48 comprises said inverters $39_1$–$39_7$. The outputs of said inverters $39_1$–$39_7$ are input to gate circuits $34_1$–$34_7$ for charging/discharging, respectively.

When gate circuits $34_1$–$34_7$ for charging/discharging are separated from ring oscillator 48, the influence of the change in the load can be eliminated.

Figure 8:
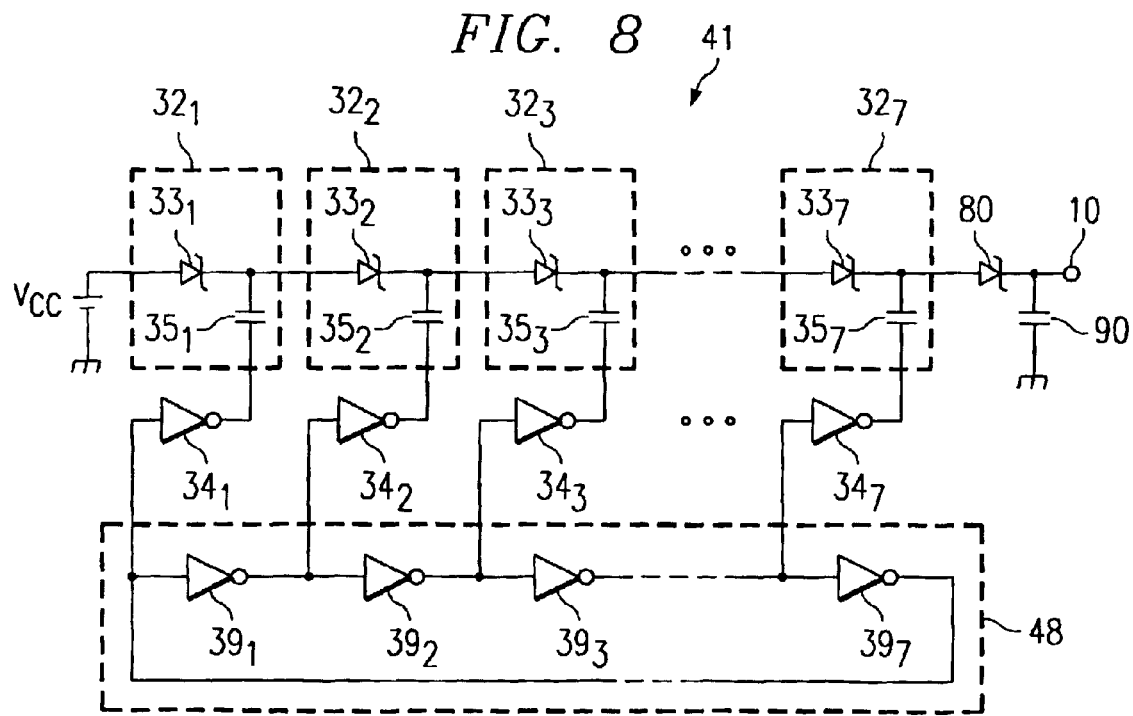
FIG. 8 is a diagram explaining a variant of the booster circuit disclosed in another embodiment of the present invention.
Figure 9:
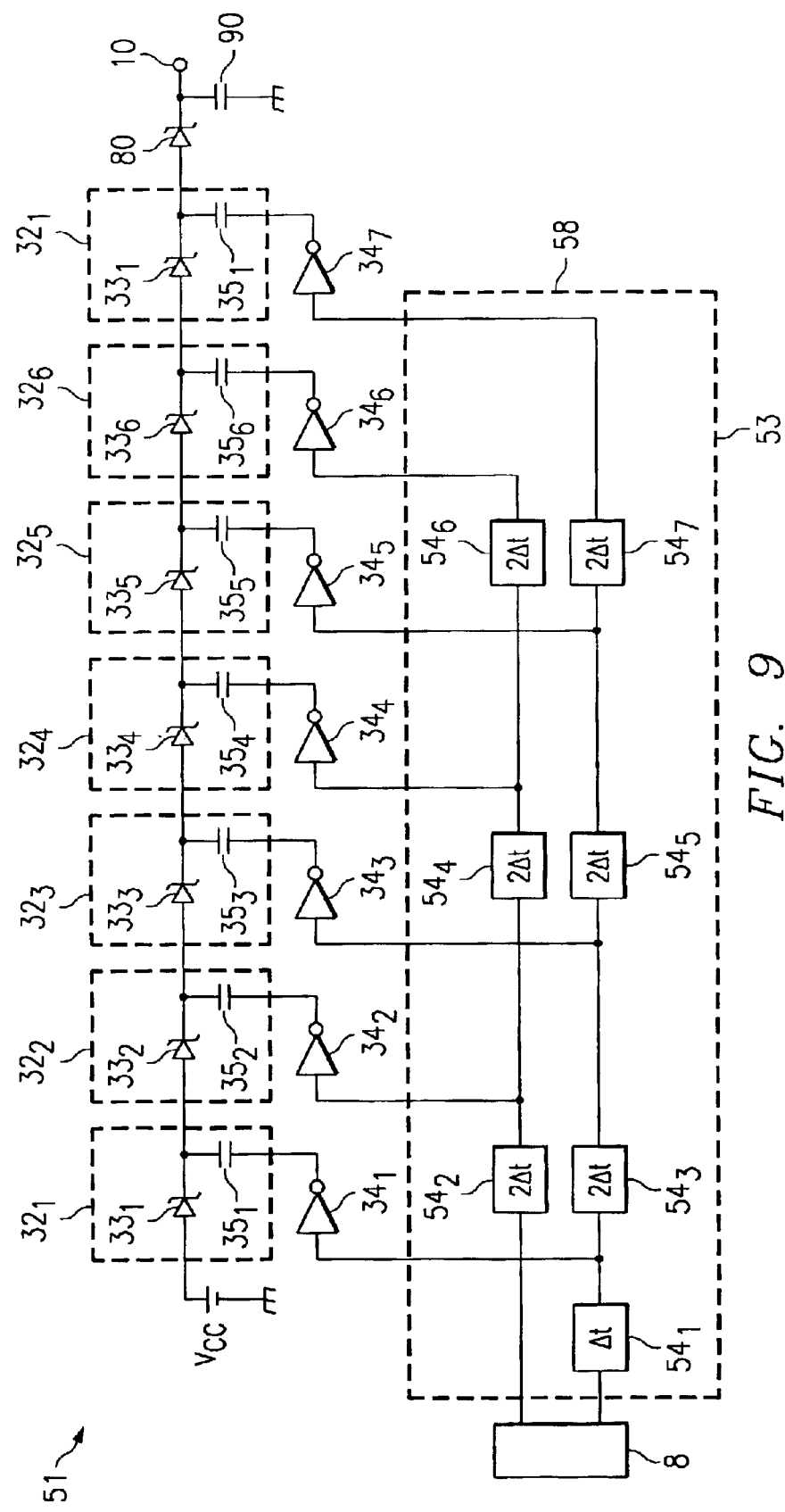
FIG. 9 is a circuit diagram illustrating the booster circuit disclosed in yet another embodiment of the present invention.
Figure 10:
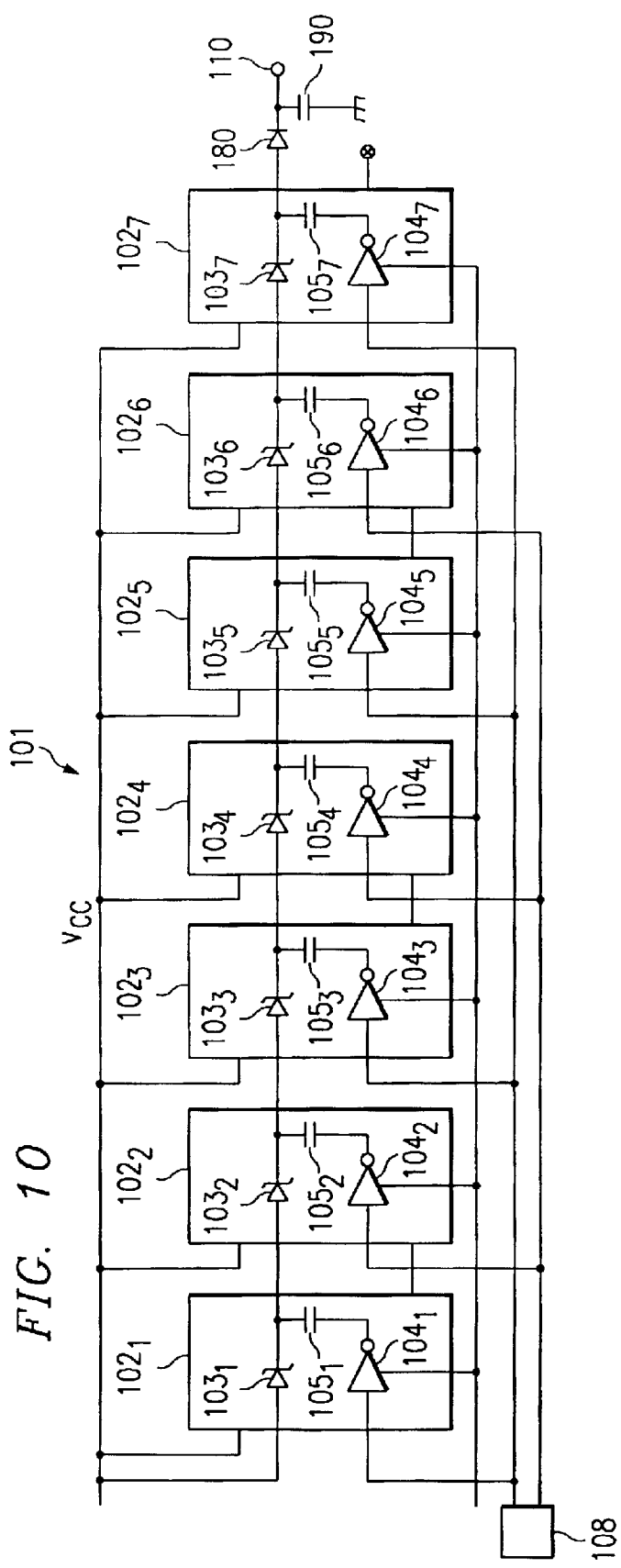
FIG. 10 is a circuit diagram illustrating an example of the conventional booster circuit.
Figure 11:
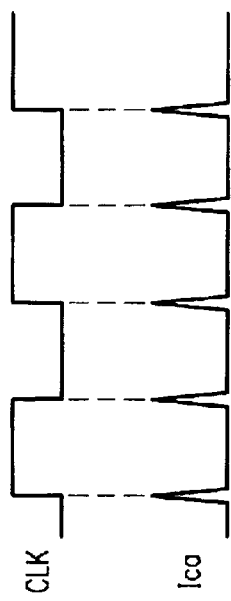
FIG. 11 is a waveform diagram explaining the operation of the conventional booster circuit.

Also, as shown in FIG. 9, instead of ring oscillator 48 used in booster circuit 41 shown in FIG. 8, it is also possible to use a signal-generating circuit 8 and a timing control circuit 58.

Timing control circuit 58 has first through seventh delay circuits $54_1$–$54_7$.

Among the first through seventh delay circuits $54_1$–$54_7$, the first, third, fifth, and seventh delay circuits $54_1$, $54_3$, $54_5$, and $54_7$ are connected to each other in series, while the second, fourth, and sixth delay circuits $54_2$, $54_4$, and $54_6$ are also connected to each other in series. The input terminals of the first and second delay circuits $54_1$ and $54_2$ are connected to the output terminal of signal-generating circuit 8. The time delay of the first delay circuit $54_1$ is taken as Δt, while the time delays of the second through seventh delay circuits $54_2$–$54_7$ are taken as 2Δt.

When a control signal is output from signal-generating circuit 8 to the first delay circuit $54_1$, the control signal is delayed by a period of Δt by the first delay circuit $54_1$ and output to the third delay circuit $54_3$. Then, the control signal is delayed by 2Δt by each of the third, fifth, and seventh delay circuits $54_3$, $54_5$, and $54_7$.

Consequently, in the third delay circuit $54_3$, the control signal is delayed by (Δt+2Δt)=3Δt, that is, the sum of the time delay Δt of the first delay circuit $54_1$ and the time delay 2Δt of the third delay circuit $54_3$ before it is output. Similarly, in the fifth delay circuit $54_5$, the control signal is delayed by (Δt+2Δt+2Δt)=5Δt before it is output. In the seventh delay circuit $54_7$, the control signal is delayed by (Δt+2Δt+2Δt+2Δt)=7Δt before it is output.

On the other hand, when a control signal with a phase opposite to that of the control signal input to the first delay circuit $54_1$ is input to the second delay circuit $54_2$, the control signal is delayed by 2Δt by each of the second, fourth, and sixth delay circuits $54_2$, $54_4$, and $54_6$. Therefore, the control signal is delayed by 2Δt, 4Δt, and 6Δt, respectively, when it is output from the second, fourth, and sixth delay circuits $54_2$, $54_4$, and $54_6$.

When the logic level of the control signal input to the first delay circuit $54_1$ is switched, the logic level of the output signal of the first delay circuit $54_1$ is switched after a period of Δt since the point in time that the logic level of the control signal is switched. Similarly, the logic levels of the output signals of the third, fifth, and seventh delay circuits $54_3$, $54_5$, and $54_7$ are switched after 3Δt, 5Δt, and 7Δt since the point in time that the logic level of the input control signal is switched, respectively. On the other hand, when the logic level of the control signal input to the second delay circuit $54_2$ is switched, the logic level of the output of the second delay circuit $54_2$ is switched after a period of 2Δt since the point in time that the logic level of the control signal is switched. Similarly, the logic levels of the output signals of the fourth and sixth delay circuits $54_4$ and $54_6$ are switched after 4Δt and 6Δt since the point in time that the logic level of the control signal is switched, respectively.

Since the control signals input to the first and second delay circuits $54_1$ and $54_2$ are out of phase, the logic levels are switched almost simultaneously between the control signals. However, as described above, in the first to the seventh delay circuits $54_1$–$54_7$, the logic level of each output signal is switched after a different time delay in the range of Δt–7Δt from the point in time that the logic level of each control signal is switched. Consequently, the logic levels of the output signals of two or more delay circuits will not be switched at the same time.

Gate circuits $34_1$–$34_7$ are synchronized with the switching of the logic levels of the output signals of delay circuits $54_1$–$54_7$ to switch the charging/discharging state of capacitors $35_1$–$35_7$ of the various charge-pump circuits. Consequently, similarly to booster circuits 31 and 41 shown in FIGS. 6 and 8 that use ring oscillators, in this case, the charging/discharging states of two or more capacitors will also not be switched at the same time. Therefore, a large flow of current can be avoided at the time that the charging/discharging state is switched.

Said booster circuits 1, 31, 41, and 51 are all composed of seven charge-pump circuits stages. However, the present invention is not limited to this number of charge-pump circuit stages.

Also, in booster circuit 51 shown in FIG. 9, the configuration of timing control circuit 58 is not limited to that shown in FIG. 9. It is also possible to output the control signal to each charge-pump circuit after it is delayed by a different period of time for each charge-pump circuit.

The power consumption and noise of a booster circuit using charge-pump circuits can be reduced.

What is claimed is:

1. A booster circuit comprising N rectifying elements that are electrically connected in series between a voltage input terminal and a voltage output terminal with the terminal on an anode side taken as the voltage input terminal side, N capacitors, each of which has one terminal electrically connected to the terminal on the cathode side of one of the rectifying elements, and a first signal supply circuit which supplies a first control signal to the capacitors of the odd-numbered stages and a second signal supply circuit which supplies a second control signal whose phase is opposite to that of the first control signal to the capacitors of the even-numbered stages; wherein a first time delay is applied sequentially to the first control signal supplied to the other terminal of each capacitor of the odd-numbered stages, and a second time delay is applied sequentially to the second control signal supplied to the other terminal of each capacitor of the even-numbered stages, wherein the first control signal is delayed by a time interval Δt before being applied to the first stage, and delayed sequentially by a time interval 2Δt between each odd-numbered stage, the second control signal is delayed by a time interval of 2Δt before being applied to the second stage and by a time interval of 2Δt between each even-numbered stage.

2. The booster circuit described in claim 1 further comprising a diode for preventing reverse current, which is electrically connected between the terminal on the cathode side of the rectifying element of the Nth stage and the voltage output terminal, and an output capacitor which is connected between the voltage output terminal and a reference potential where the rectifying elements are made of diodes, and an inverter is coupled between the first and second control signals supplied to the odd-numbered and even-numbered stages, respectively and the other terminal of each respective capacitor.

* * * * *